(12) United States Patent  (10) Patent No.: US 6,508,575 B2
Okubo et al.  (45) Date of Patent: Jan. 21, 2003

(54) LAMP FOR AUTOMOBILE (75) Inventors: Yasuhiro Okubo, Isehara (JP);
Shouichi Fukushima, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 09/778,757

(22) Filed: Feb. 8, 2001

(65) Prior Publication Data

US 2001/0021111 A1 Sep. 13, 2001

(30) Foreign Application Priority Data

Feb. 17, 2000 (JP) ........................................ 2000-045161

(51) Int. Cl.[7] ................................................. F21V 7/00
(52) U.S. Cl. ..................... 362/516; 362/518; 362/512; 362/464; 362/465; 362/322; 362/324; 362/284; 362/282
(58) Field of Search ................................ 362/516, 518, 362/512, 513, 282, 284, 464, 465, 322, 324

(56) References Cited

U.S. PATENT DOCUMENTS 5,264,993 A * 11/1993 Neumann et al. ............. 362/61
6,328,463 B1 * 12/2001 Okubo ....................... 362/518

* cited by examiner

Primary Examiner—Stephen Husar
Assistant Examiner—Bertrand Zeade
(74) Attorney, Agent, or Firm—Foley & Lardner (57) ABSTRACT A light source valve 2 is disposed on a non-effective reflecting surface 13 of a reflector 1, and a movable shade 3 is disposed around the light source valve 2 such that the movable shade 3 can rotate between a first position and a second position. The non-effective reflecting surface 13 of the reflector 1 is provided with a first reflecting surface 11 for forming a low bend beam light distribution pattern LBP and a second reflecting surface for forming a high bend beam light distribution pattern HBP.

7 Claims, 12 Drawing Sheets

LAMP FOR AUTOMOBILE

BACKGROUND OF THE INVENTION

1. Field of the Invention

The present invention relates to a lamp for an automobile for illuminating left side and right side with respect to a direction of travel of the automobile, and more particularly, to a lamp for an automobile in which special space for mounting the lamp to a vehicle body is unnecessary, synthesis of desired light distribution pattern can easily be obtained, and excellent bend light distribution pattern can be obtained at the time of medium speed or high speed running.

In the present specification and drawings, a symbol "L" means "left side" as viewed from a driver's side, a symbol "R" means "right side" as viewed from the driver's side, a symbol "U" means "up side" as viewed from the driver's side, a symbol "D" means "down side" as viewed from the driver's side, a symbol "F" means "front side" as viewed from the driver's side, and a symbol "B" means "back side" as viewed from the driver's side. Symbols "HL-HR" and "HR-HL" mean "horizontal axis" which is horizontal with respect to an optical axis of a head lamp for the automobile or "horizontal axis" of light distribution pattern. A symbol "VU-VD" means "vertical axis" which is vertical with respect to an optical axis of the head lamp for the automobile or "vertical axis" of light distribution pattern. A symbol "ZF-ZB" means a direction of travel of the automobile which is in parallel to the optical axis of the head lamp for the automobile.

2. Description of the Related Art

Figure 1:
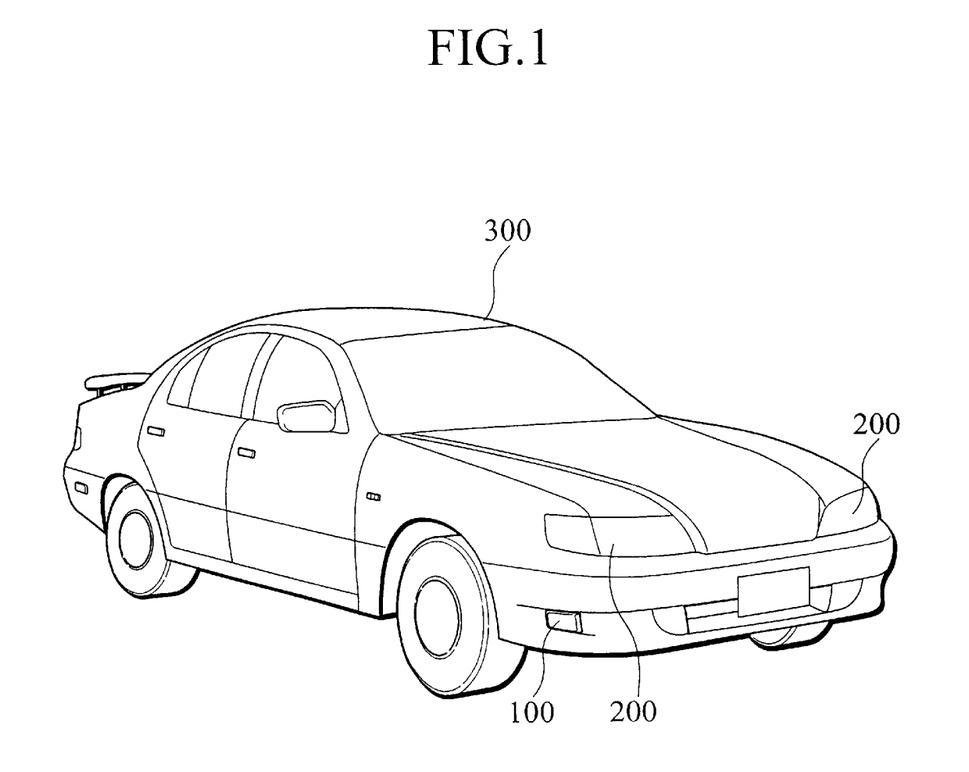
FIG. 1 is a perspective view of an automobile to which automobile bend lamps and automobile head lamps are mounted.

According to the research of the present inventors, as shown in FIG. 1, automobile head lamps 100 are generally mounted to left and right sides of front portions of an automobile 300, e.g., on front bumper sides separately from automobile head lamps 200.

Figure 2:
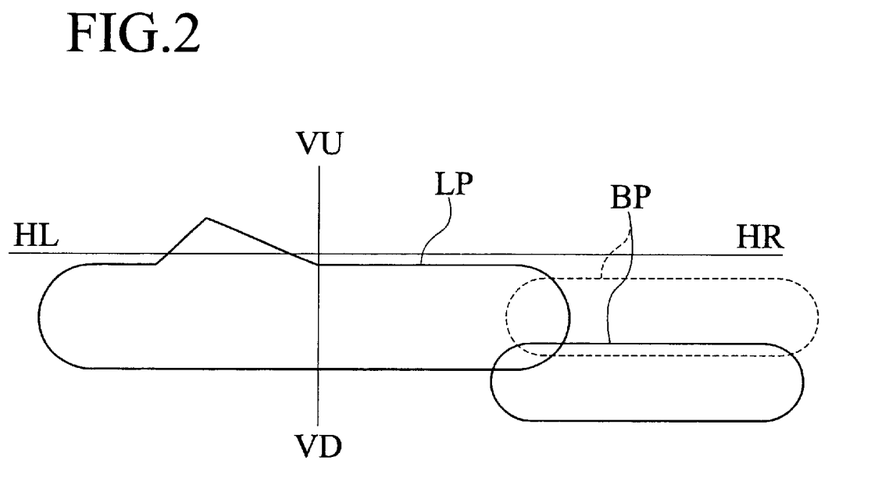
FIG. 2 is an explanatory view for showing a conventional screen image in which a low bend beam light distribution pattern and a low beam light distribution pattern are synthesized.
Figure 3:
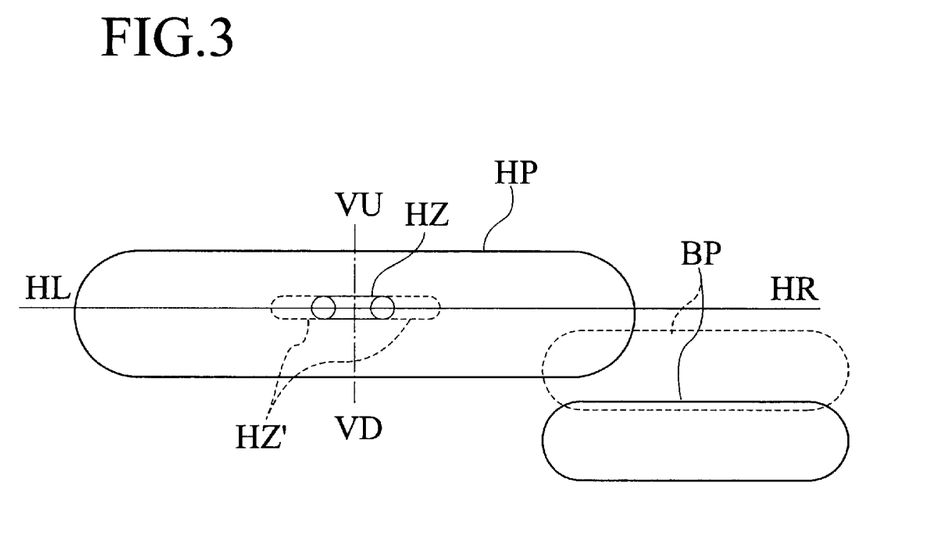
FIG. 3 is an explanatory view for showing a conventional screen image in which a high bend beam light distribution pattern and a high beam light distribution pattern are synthesized.
Figure 4:
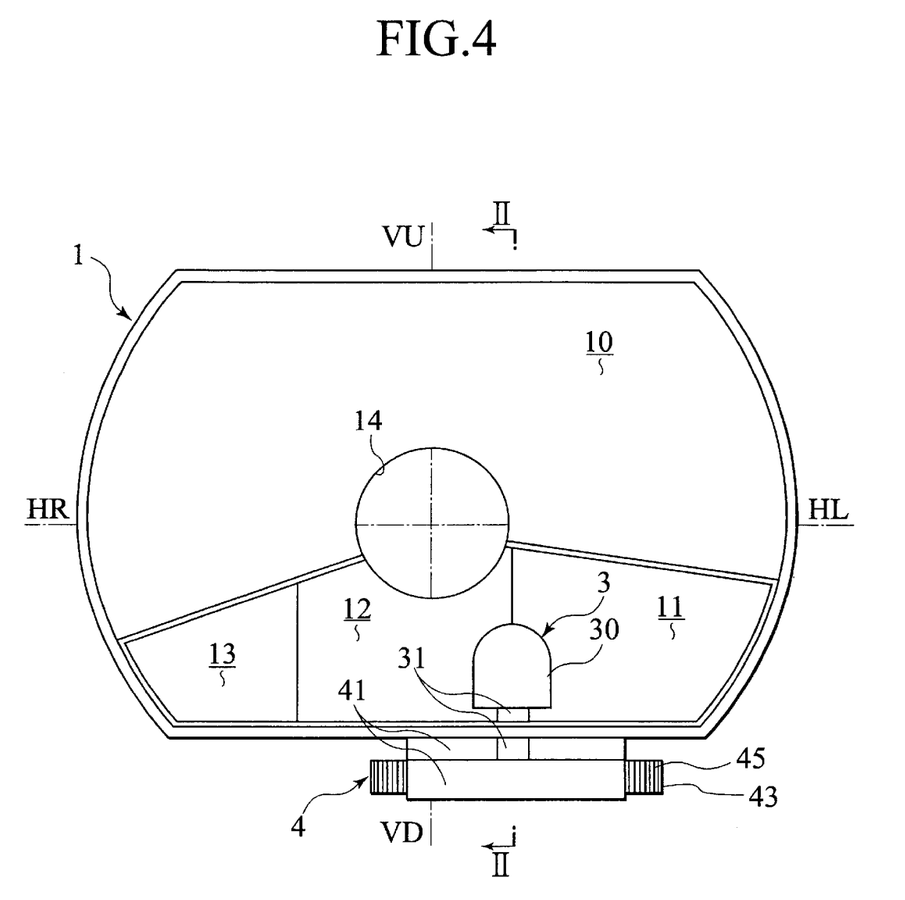
FIG. 4 is a front view of an essential portion (reflector) showing an embodiment of the automobile lamp.

The automobile head lamps 100 light up when a blinker switch is ON and a steering wheel is being operated, a light distribution pattern BP for bend beam shown in FIGS. 2 and 3 is obtained, and left and right sides of the automobile with respect to a direction of straight traveling of the automobile are illuminated.

That is, as shown in FIG. 2, a light distribution pattern BP for bend beam is synthesized with right side of a light distribution pattern LP for low beam (dipped-beam) obtained by the automobile head lamp 200, and the right side of the automobile is illuminated. Further, as shown in FIG. 3, the light distribution pattern BP for bend beam is synthesized with right side of a light distribution pattern HP for high beam (traveling beam) obtained by the automobile head lamp 200, and the right side of the automobile is illuminated.

Although it is not illustrated in the drawings, when the blinker switch is ON leftward and the steering wheel is operated leftward, the bend beam light distribution pattern BP is synthesized with the left side of the low beam light distribution pattern LP and the high beam light distribution pattern HP, and the left side of the automobile is illuminated.

The light distribution patterns LP and HP shown in FIGS. 2 and 3 are those under the keep to the left traffic, and under the keep to the right traffic, the light distribution patterns LP and HP are reversed left to right.

However, since the above-described conventional automobile bend lamps 100 are mounted to the automobile 300 separately from the automobile head lamps 200, there are following problems:

That is, special space for mounting the automobile bend lamp to the vehicle body is required, and this limits the design of the automobile.

If the vehicle type differs, positions for mounting the automobile bend lamp 100 to the vehicle body differs. The bend beam light distribution pattern BP and the low beam light distribution pattern LP are not easily synthesized due to variation in mounting precision. For example, the bend beam should basically be located on the right side (or left side) of the low beam light distribution pattern LP as shown with dotted line in FIG. 2, but the bend beam light distribution pattern BP may be located at a position lower to the basic position in some cases. In such a case, the mounting position of the automobile bend lamp 100 is adjusted to obtain desired light distribution patterns LP and BP.

Further, at the time of the automobile 300's medium speed or high speed running, it is necessary to visually check far sight. Therefore, it is preferable to synthesize an auxiliary hot zone HZ' (shown with broken line) with left and right sides of a hot zone HZ (shown with solid line) of the high beam light distribution pattern HP as shown in FIG. 3. However, since the bend beam light distribution pattern BP is located on the right side (or left wide) of the high beam light distribution pattern HP, the bend beam light distribution pattern BP for illuminating left or right side with respect to the direction of travel of the automobile 300 is visually obtrusive on the contrary at the time of medium speed or high speed running.

SUMMARY OF THE INVENTION

Thereupon, it is an object of the present invention to provide a lamp for an automobile in which special space for mounting the lamp to a vehicle body is unnecessary, synthesis of desired light distribution pattern can easily be obtained, and excellent bend light distribution pattern can be obtained at the time of medium speed or high speed running.

To achieve the above object, the present invention provides an automobile lamp comprising a reflector for forming a light distribution pattern by reflecting light from a light source, an effective reflecting surface provided on the reflector for forming at least one of a low beam light distribution pattern and a high beam light distribution pattern, a non-effective reflecting surface provided on the reflector for forming at least one of a low bend beam light distribution pattern and a high bend beam light distribution pattern, a light source valve disposed on the reflector on the side of the non-effective reflecting surface, a movable shade disposed around the light source valve such that the movable shade can move between a first position and a second position, driving means for moving the movable shade between the first position and the second position, a first reflecting surface provided on the non-effective reflecting surface of the reflector for forming the low bend beam light distribution pattern with light from the light source valve when the movable shade moves to the first position, and a second reflecting surface provided on the non-effective reflecting surface of the reflector for forming the high bend beam light distribution pattern with light from the light source valve when the movable shade moves to the second position.

Since the automobile bend lamp of the present invention is mounted to the reflector of the automobile head lamp, special space for mounting the bend lamp to the vehicle body is unnecessary, and the problem of limitation of the design of the automobile is solved.

In the case of the automobile bend lamp in the automobile lamp of the invention, even if the type of vehicle differs, a desired light distribution pattern can easily be obtained without variation in mounting precision by mounting the automobile bend lamp to the reflector of the automobile head lamp.

The automobile lamp of the invention can obtain the excellent spot-like high bend beam light distribution pattern HBP at the time of medium speed running by the second reflecting surface.

DESCRIPTION OF THE PREFERRED EMBODIMENT

An embodiment of an automobile lamp of the present invention will be explained with reference to FIGS. 4 to 19. In the drawings, the same symbols as those used in FIGS. 1 to 3 designate the same members. This embodiment is used for a keep to the left traffic, but under the keep to the right traffic, the embodiment is reversed left to right. In this embodiment, members are mounted to on the right side of the front portion of the automobile, and members mounted on the left side are symmetrical with those mounted to the right side.

Figure 5:
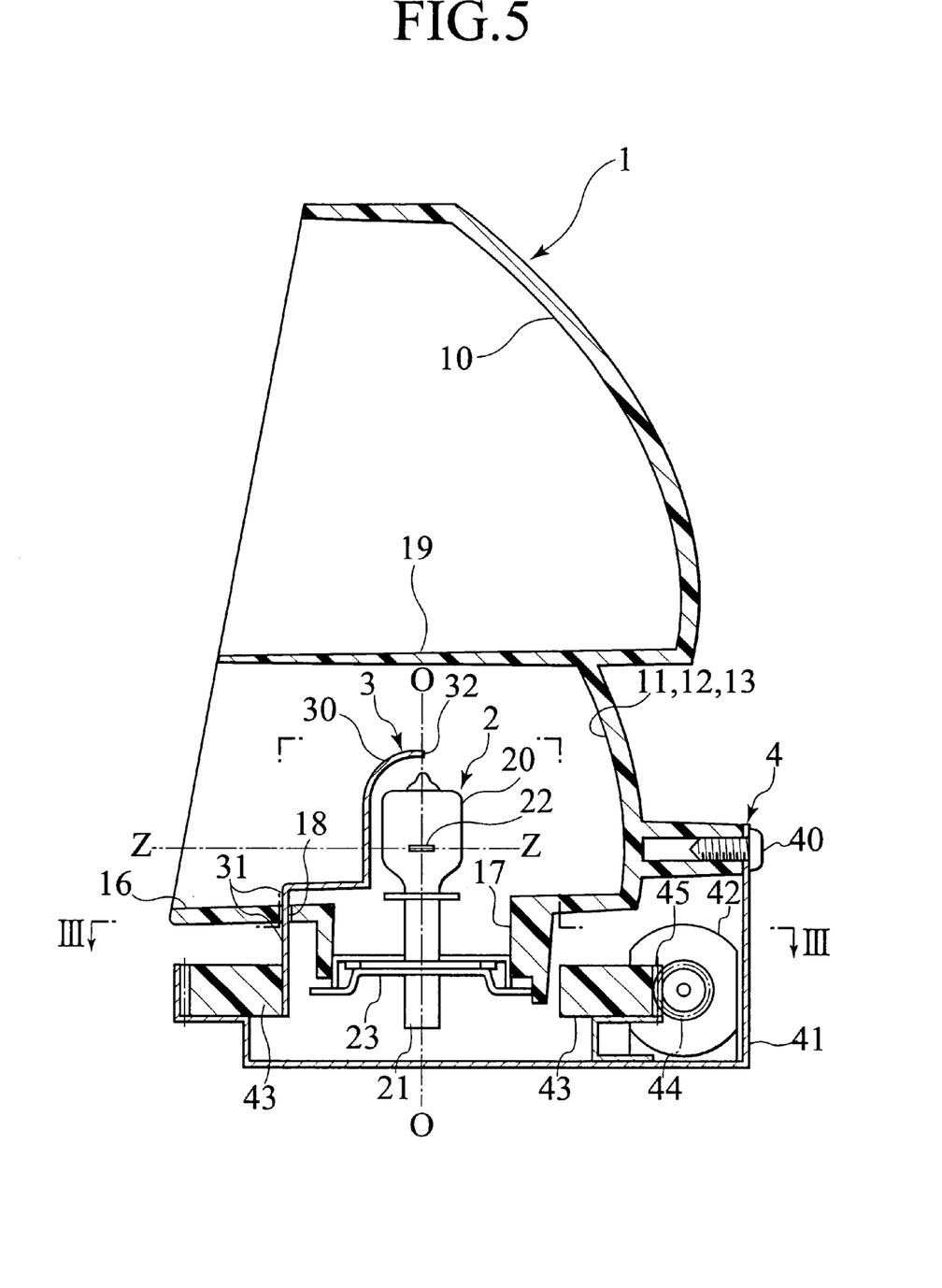
FIG. 5 is a sectional view taken along a line V—V in FIG. 4.
Figure 6:
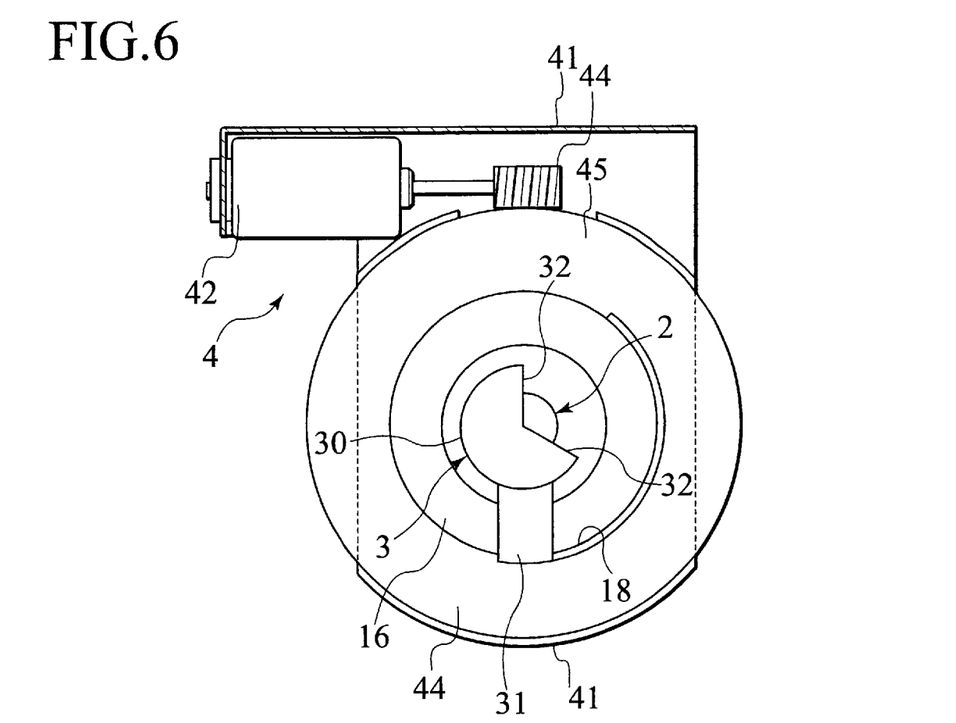
FIG. 6 is a sectional view taken along a line VI—VI in FIG. 5.
Figure 7:
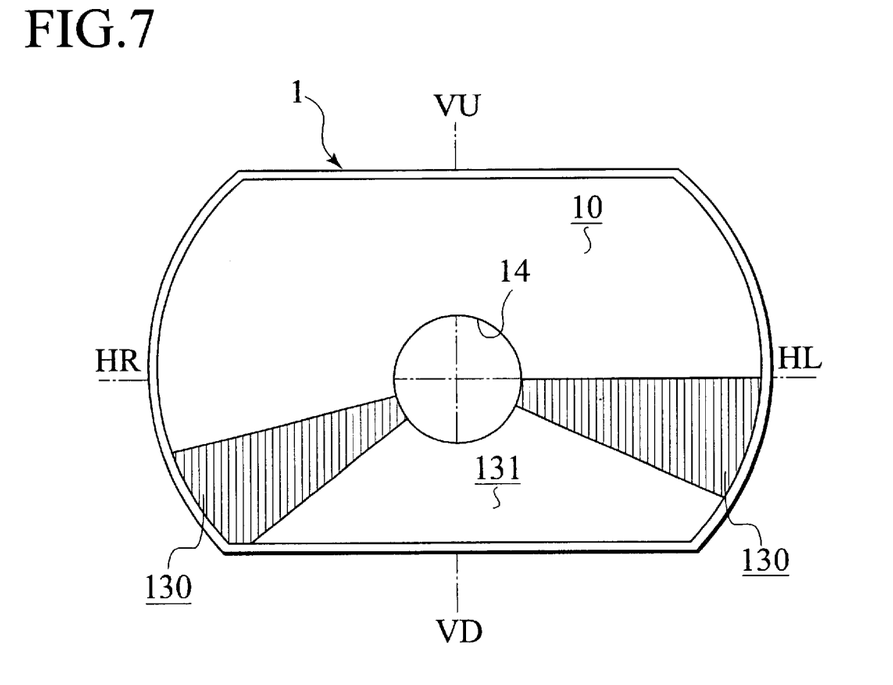
FIG. 7 is a frontal explanatory view of the reflector showing a portion that is light-shielded by a cut line stripe of an effective reflection surface and a charge lamp.
Figure 8:
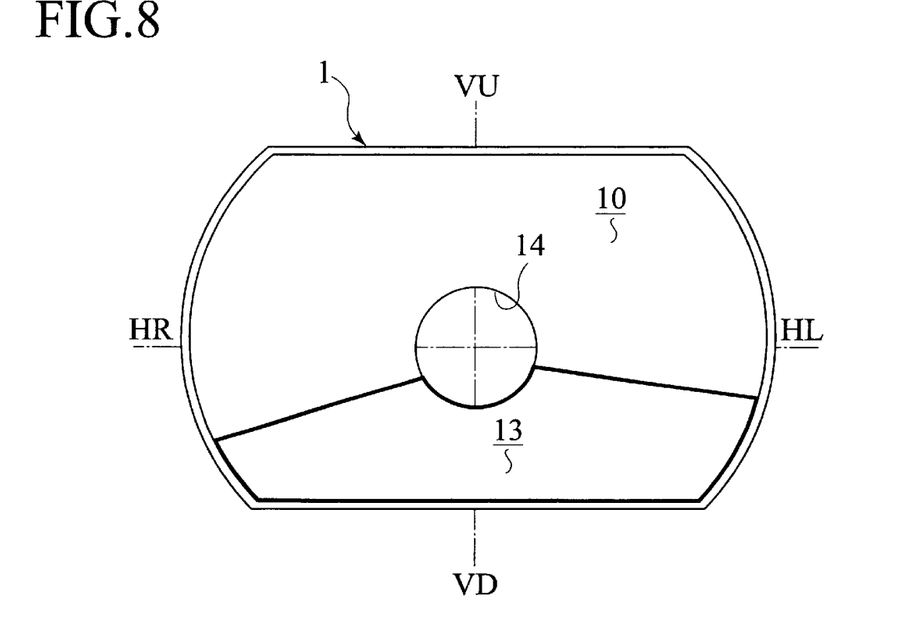
FIG. 8 is a frontal explanatory view of the reflector showing a main reflecting surface and a non-main reflecting surface.

In the drawings, a symbol 1 represents a reflector of an automobile head lamp. The automobile head lamp in this embodiment is a "front lamp" of Japanese Patent Application Laid-open No. H11-50875(not Prior Art) for example, and is a double-lamp type head lamp using a discharge lamp (high pressure metal vapor discharge lamp, high illumination discharge lamp (HID) or the like such as metal halide lamp) as a light source valve. As shown in FIGS. 4, 5, 7 and 8, the reflector 1 includes an effective reflecting surface 10 forming a low beam light distribution pattern LP and a high beam light distribution pattern HP, and a non-effective reflecting surface 13 which is not used. The effective reflecting surface 10 is formed on substantially upper half of the reflector 1, and comprises a compound reflection surface for controlling the light distribution patterns LP and HP. Details of the compound reflecting surface are described in Japanese Patent Application Laid-open No. H9-306220. The non-effective reflecting surface 13 is formed on substantially lower half of the reflector 1. As shown in FIG. 5, a central partition wall 19 is integrally formed between the effective reflecting surface 10 and the non-effective reflecting surface 13.

The reflector 1 is disposed in a lamp chamber (not shown) partitioned by a lamp housing (not shown) and a front lens (not shown) of the automobile head lamp, and is mounted to the lamp housing through an optical axis adjusting mechanism (not shown) such that the optical axis can be adjusted in the vertical and lateral directions. The reflector 1 is provided at its substantially central portion with a circle through hole 14. A discharge lamp (not shown) is inserted through the through hole 14, and this discharge lamp is detachable mounted to the reflector 1.

The non-effective reflecting surface 13 of the reflector 1 is formed in a range comprising portions 130 (shaded areas in FIG. 7) which are light-shielded by cut line stripe of the discharge lamp (band-like coating or the like coated on a glass valve (outer tube) of the discharge lamp) and a portion 131 which is light-shielded by a shade (not shown). In this embodiment, the non-effective reflecting surface 13 is formed in a range surrounded by thick solid line in FIG. 8.

A first reflecting surface 11 and a second reflecting surface 12 are provided in the non-effective reflecting surface 13 of the reflector 1.

Figure 9:
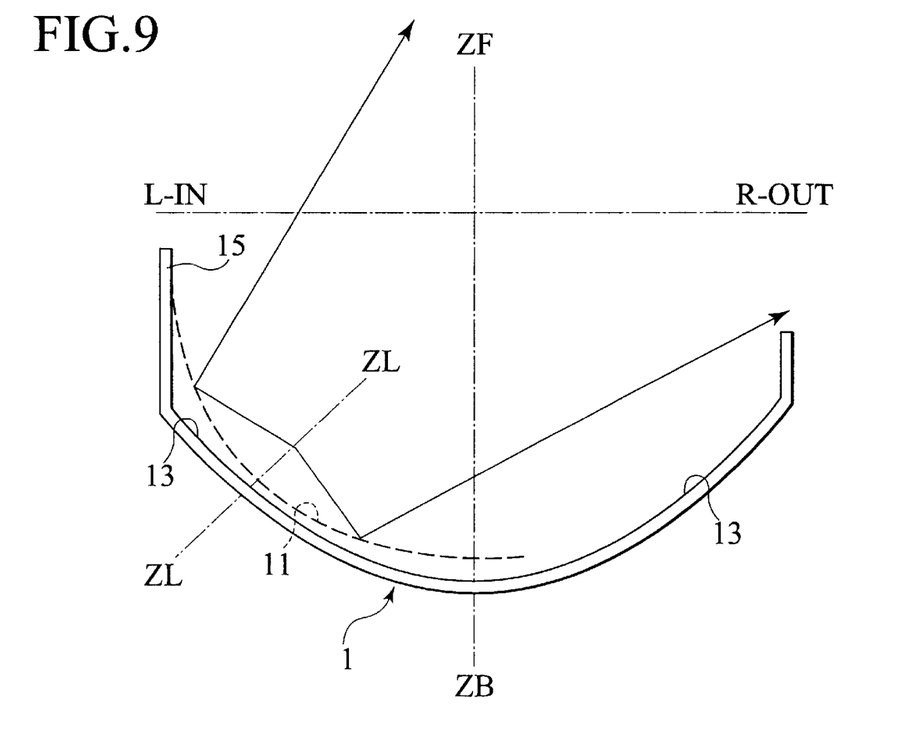
FIG. 9 is a transverse sectional explanatory view of the reflector showing a state in which a first reflecting surface is provided utilizing an inner rising wall of the automobile among reflectors.
Figure 10:
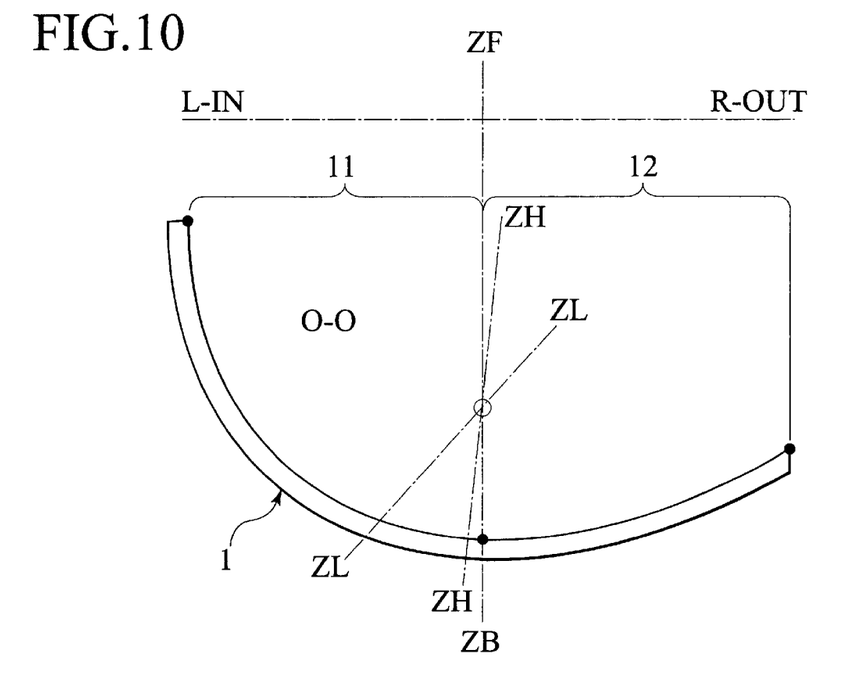
FIG. 10 is a transverse sectional explanatory view of the reflector showing a relative positional relation between a traveling direction of the automobile and optical axes of the first and second reflecting surfaces.
Figure 15:
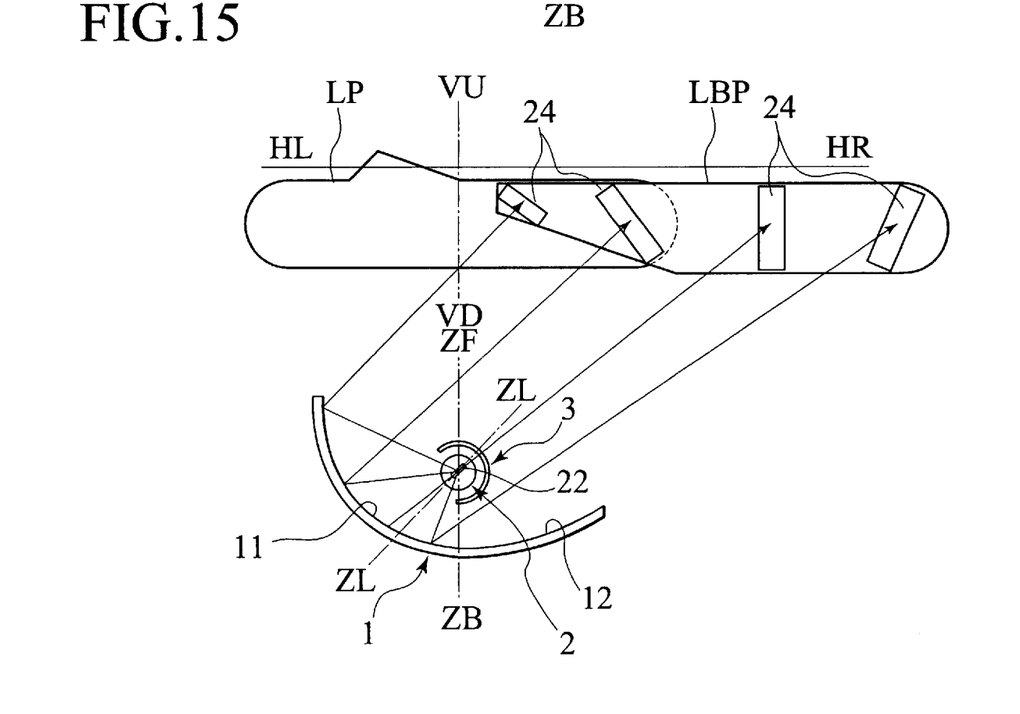
FIG. 15 is an explanatory view showing, with a screen image, a state in which a low bend beam light distribution pattern emitted from the first reflecting surface and a low beam light distribution pattern are synthesized.

The first reflecting surface 11 forms a low bend beam light distribution pattern LBP shown with thick solid line in FIG. 15, and the first reflecting surface 11 is provided utilizing a rising wall 15 of inner side L-IN of the automobile. As shown with solid arrows in FIG. 9, this is because it is possible to illuminate side of an outer side R-OUT of the automobile over a wide range, and this is most suitable for forming the low bend beam light distribution pattern LBP (see FIG. 15) for illuminating the side over the wide range. As shown in FIG. 10, the first reflecting surface 11 forms a diverging type free curved surface in which the optical axis ZL—ZL is inclined at about 35° to 45°, and more preferably about 40° toward the outer side R-OUT with respect to the traveling direction ZF-ZB of the automobile.

On the other hand, the second reflecting surface 12 forms a spot-like high bend beam light distribution pattern HBP, and is provided outer side R-OUT with respect to the first reflecting surface 11. The second reflecting surface 12 forms a paraboloid or free curved surface in which the optical axis ZH—ZH is inclined at about 5° with respect to the traveling direction ZF-ZB.

The optical axis ZL—ZL of the first reflecting surface 11 and the optical axis ZH—ZH pass through a center axis O—O of the light source valve 2.

In the drawings, the symbol 2 represents the light source valve. The light source valve 2 is a halogen lamp of C-6 type, and comprises a glass valve 20 and a pinch portion 21, a filament 22 inserted into the center axis O—O of the light source valve 2 of the glass valve 20 perpendicularly, and a mounting brim 23 fixed to the pinch portion 21. The light source valve 2 is disposed on the side of the non-effective reflecting surface 13 of the reflector 1.

That is, the light source valve 2 is inserted toward the non-effective reflecting surface 13 from a mounting hole 17 provided in a bottom wall 16 of the reflector 1 perpendicularly, and the light source valve 2 is detachably mounted to the reflector 1 through the mounting brim 23. By mounting the mounting hole 17 to the bottom wall 16 of the reflector 1, there is not reflection surface loss by the mounting hole 17 in the first reflecting surface 11 and the second reflecting surface 12 on the side of the non-effective reflecting surface 13.

Since the light source valve 2 is mounted to the reflector 1 perpendicularly, the center axis O—O of the light source valve 2 is substantially in parallel to the vertical axis VU-VD, and an axis Z—Z of the filament 22 of the light source valve 2 is substantially in parallel to the horizontal axes HL-HR and HR-HL.

Figure 11:
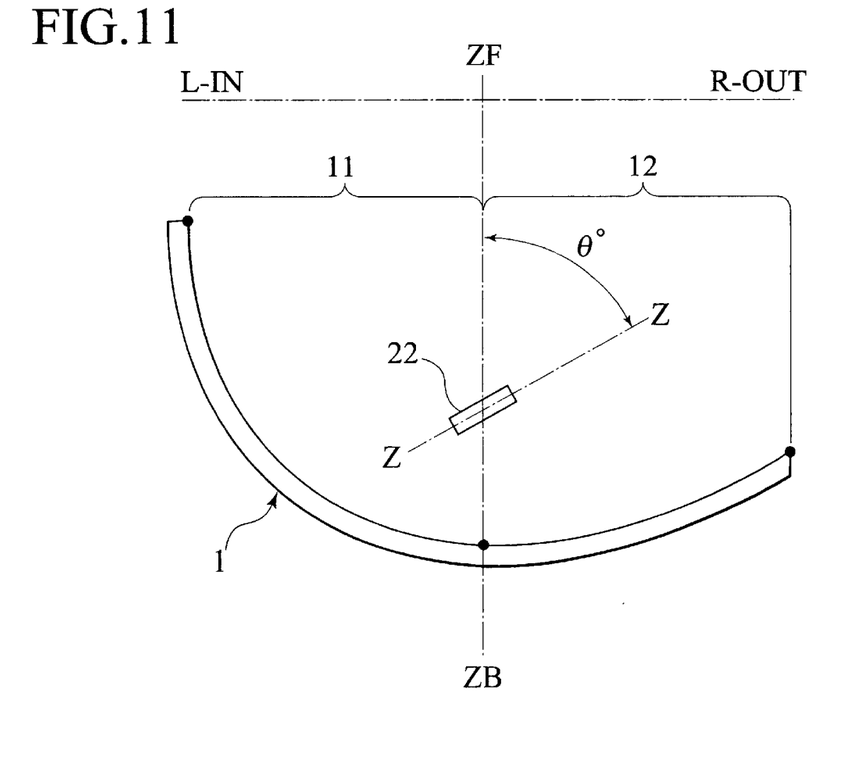
FIG. 11 is a transverse sectional explanatory view of the reflector showing a relative positional relation between the traveling direction of the automobile and filament axis of a light source valve.
Figure 12:
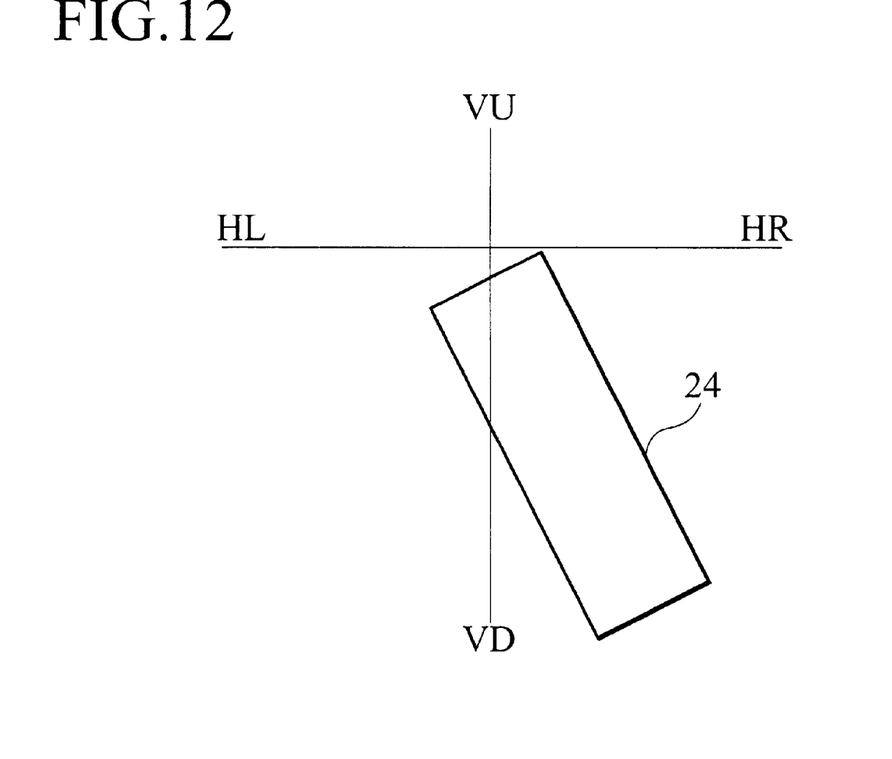
FIG. 12 is an explanatory view showing a reflection image of the filament obtained by the first reflecting surface with a screen image.
Figure 13:
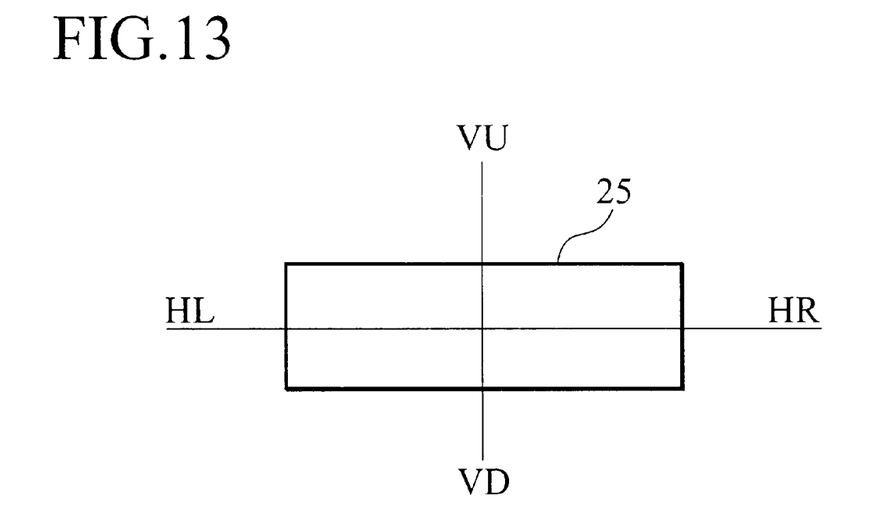
FIG. 13 is an explanatory view showing a reflection image of the filament obtained by the second reflecting surface with a screen image.

As shown in FIG. 11, the axis Z—Z is inclined at θ (about 60°) toward the outside R-OUT with respect to the traveling direction ZF-ZB of the automobile. By inclining the axis Z—Z of the filament, the following merit can be obtained:

That is, a reflection image 24 of the filament 22 in the first reflecting surface 11 is long in its longitudinal direction as shown in FIG. 12, and this is most suitable for forming the low bend beam light distribution pattern LBP (see FIG. 15) for illuminating the side over the wide range. A reflection image 25 of the filament 22 in the second reflecting surface 12 is long in its lateral direction as shown in FIG. 13, and this is most suitable for forming the high bend beam light distribution pattern HBP (see FIG. 18) for illuminating in the spot-like manner.

In the drawings, a symbol 3 represents a movable shade. The movable shade 3 is disposed such that it can move between a first position (position shown in FIGS. 4, 5, 6, 14 and 15) and a second position (position shown in FIGS. 17 and 18) around the light source valve 2, i.e., such that it can rotate around the center axis O—O of the light source valve 2. The movable shade 3 integrally comprises a dome-like shade portion 30 and a leg portion 31. The shade portion 30 covers the periphery of the light source valve 2. The leg portion 31 is fixed to a turning table 43 (which will be described later) through an arc groove 18 formed in the bottom wall 16 of the reflector 1.

The shade portion 30 of the movable shade 3 is provided with a projection light opening 32. The opening 32 is opened such that when the opening 32 of the shade portion 30 of the movable shade 3 is located at the first position, light from the light source valve 2 is emitted to the first reflecting surface 11 as shown with solid arrows in FIGS. 14 and 15, and when the shade portion 30 of the movable shade 3 is located at the second position, the light from the light source valve 2 is emitted to the second reflecting surface 12 as shown with solid arrows in FIGS. 17 and 18.

In the drawings, a symbol 4 represents driving means. The driving means 4 is for moving the movable shade 3 between the first and second positions, and comprises a mounting bracket 41 fixed to the reflector 1 by means of a screw 40 or the like, a motor 42 fixed to the mounting bracket 41, and the turning table 43 supported on the mounting bracket 41 such that the turning table 43 can rotate around the center axis Z—Z of the light source valve 2. A worm 44 fixed to the rotation shaft of the motor 42 and the teeth 45 mounted on an outer peripheral surface of the turning table 43 are meshed with each other.

The light source valve 2, the movable shade 3 and the driving means 4 are formed as one unit and mounted to the reflector 1.

The light source valve 2 and the motor 42 are connected to a blinder switch (not shown), a steering sensor (not shown) and a vehicle speed sensor and the like through a control section (not shown). Under the conditions shown in the following Table 1 and the operation pattern, the light source valve 2 lights up by the control section and at the same time, the motor 42 is rotated in the normal direction to move the movable shade 3 from the second position to the first position, and when the movable shade 3 moves to the first position, the normal rotation of the motor 42 is stopped or the motor 42 is rotated reversely, and the movable shade 3 moves from the first position to the second position, and when the movable shade 3 moves to the second position, the reverse rotation of the motor 42 is stopped.

That is, an operation pattern 1 is a pattern before an intersection for turning to the left or right for example. In this case, the automobile is running at a low speed, the steering wheel is not operated, the blinker switch is ON, and the movable shade 3 is located at the first position.

An operation pattern 2 is a pattern when the automobile is on a curve in urban area for example. In this case, the automobile is running at a low speed, the steering wheel is being operated, the blinker switch is OFF, and the movable shade 3 is located at the first position.

An operation pattern 3 is a pattern when the automobile is on a curve in suburban area for example. In this case, the automobile is running at a medium speed, the steering wheel is being operated, the blinker switch is OFF, and the movable shade 3 is located at the first position.

An operation pattern 4 is a pattern when the automobile makes a lane change in suburban area for example. In this case, the automobile is running at a medium speed, the steering wheel is not operated, the blinker switch is ON, and the movable shade 3 is located at the second position.

An operation pattern 5 is a pattern when the automobile is on a curve on an expressway for example. In this case, the automobile is running at a high speed, the steering wheel is being operated, the blinker switch is OFF, and the movable shade 3 is located at the second position.

Lastly, an operation pattern 6 is a pattern when the automobile makes a lane change on an expressway for example. In this case, the automobile is running at a high speed, the steering wheel is not operated, the blinker switch is ON, and the movable shade 3 is located at the second position.

These operation patterns are collectively shown in Table 1.

Operational effect of the automobile lamp of the present invention having the above-described structure in this embodiment will be explained.

Figure 14:
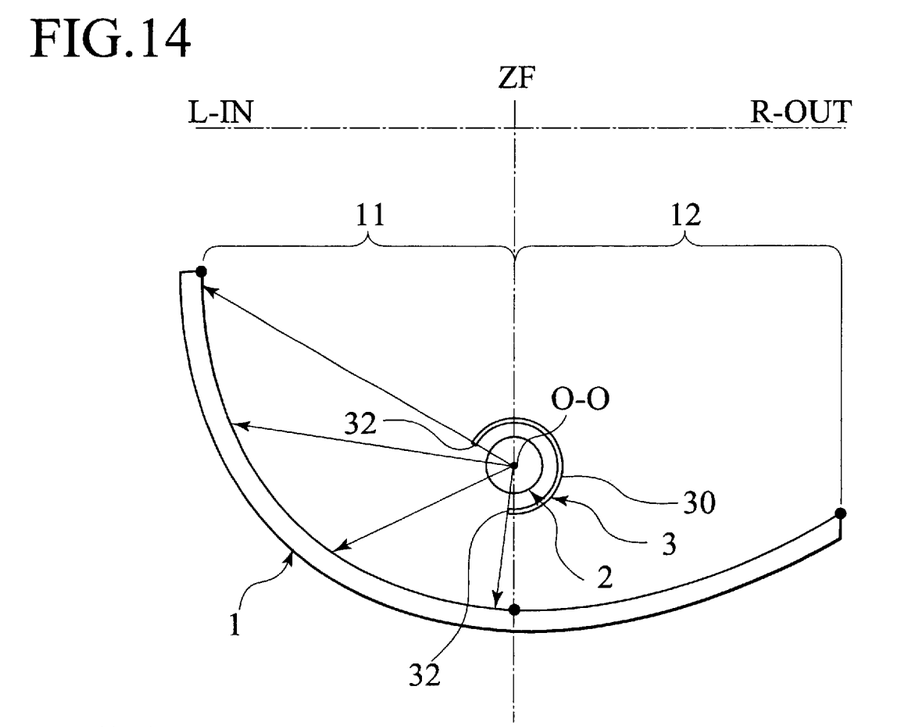
FIG. 14 is a transverse sectional explanatory view of the reflector showing a state in which the first reflecting surface is radiated with light from the light source valve with respect to a first position of a movable shade.
Figure 16A:
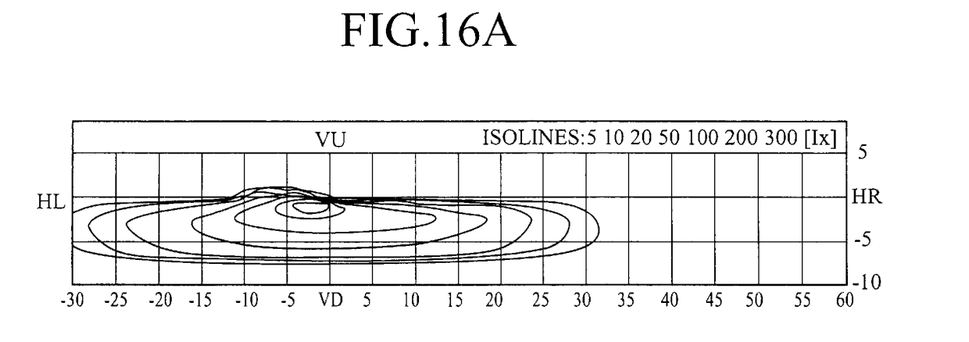
FIG. 16A is a diagram showing curved lines of illumination of low beam.
Figure 16B:
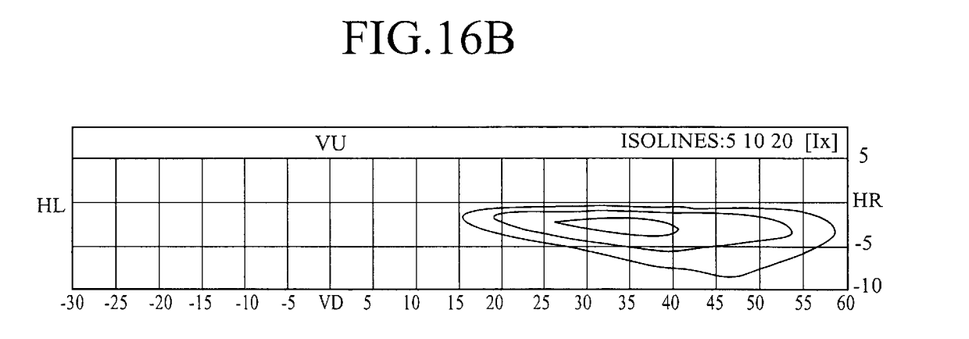
FIG. 16B is a diagram showing curved lines of illumination of low bend beam.
Figure 16C:
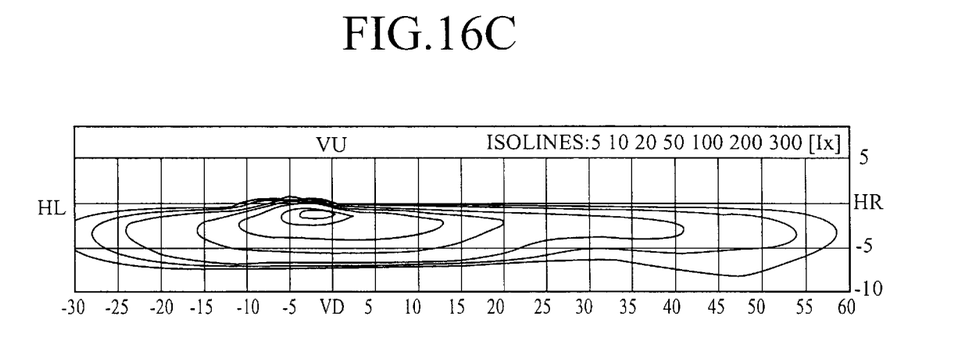
FIG. 16C is a diagram showing curved lines of illumination of a state in which the low beam and low bend beam are synthesized.

First, in the case of the operation patterns 1, 2 and 3 for example, the movable shade 3 is located at the first position. The light from the light source valve 2 is reflected by the first reflecting surface as shown in FIGS. 14 and 15, and illuminates the outer side R-OUT of the automobile as the low bend beam light distribution pattern LBP illuminating the side over the wide range. As a result, the low bend beam light distribution pattern LBP shown in FIGS. 15 and 16B is synthesized on the right side of the low beam light distribution pattern LP, and the light distribution patterns LP and LBP shown in FIGS. 15 and 16C can be obtained as a whole.

Figure 17:
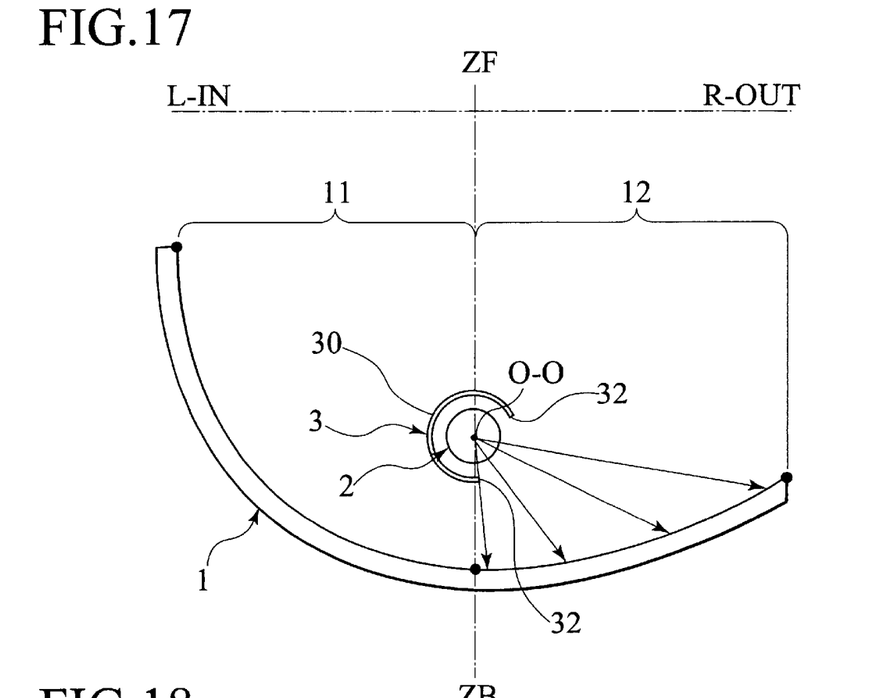
FIG. 17 is a transverse sectional explanatory view of the reflector showing a state in which the second reflecting surface is radiated with light from the light source valve with respect to a second position of a movable shade.
Figure 18:
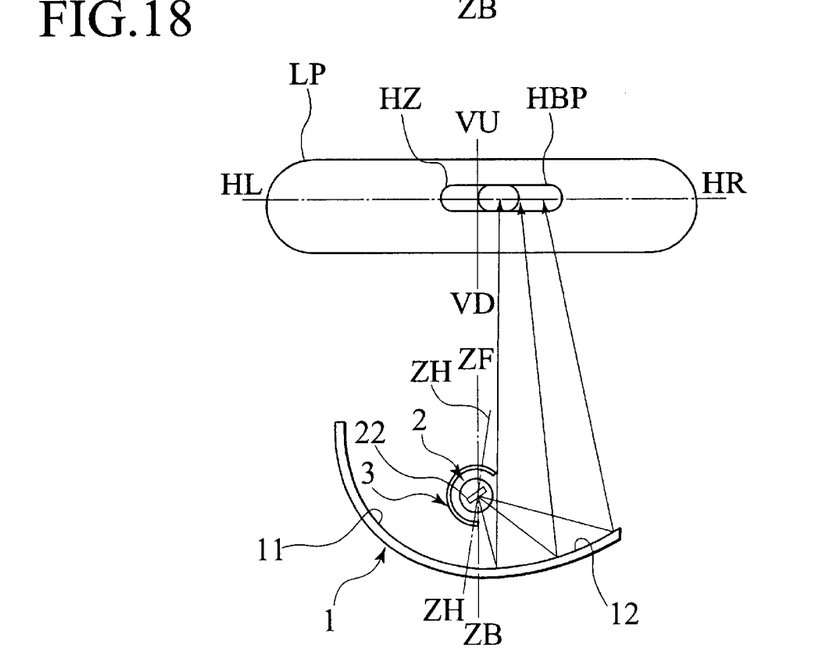
FIG. 18 is an explanatory view showing, with a screen image, a state in which a high bend beam light distribution pattern emitted from the second reflecting surface and a high beam light distribution pattern are synthesized.
Figure 19A:
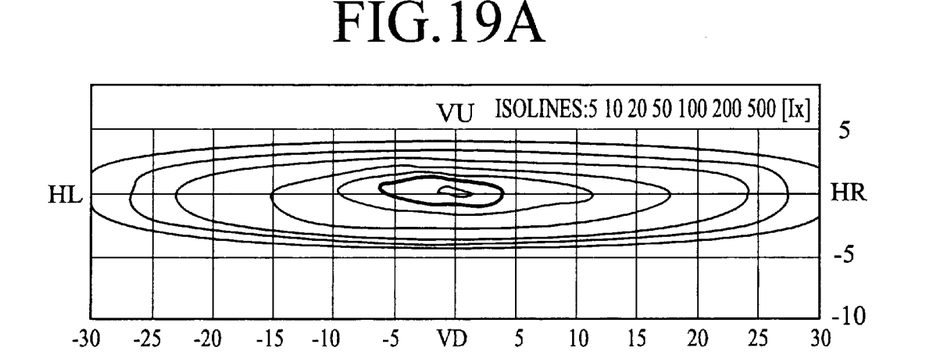
FIG. 19A is a diagram showing curved lines of illumination of high beam.
Figure 19B:
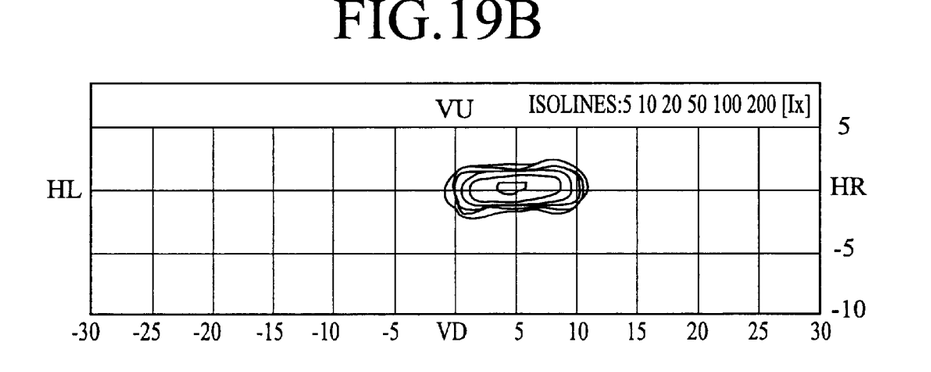
FIG. 19B is a diagram showing curved lines of illumination of high bend beam.
Figure 19C:
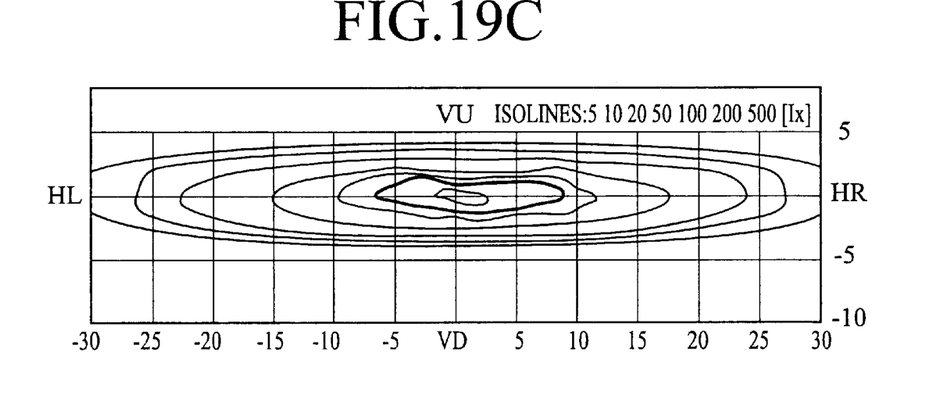
FIG. 19C is a diagram showing curved lines of illumination of a state in which the high beam and high bend beam are synthesized.

In the case of the operation patterns 4, 5 and 6 for example, the movable shade 3 is located at the second position. The light from the light source valve 2 is reflected on the second reflecting surface as shown in FIGS. 17 and 18, and illuminates front of the automobile as the spot-like high bend beam light distribution pattern HBP. As a result, the spot-like high bend beam light distribution pattern HBP shown in FIGS. 18 and 19B is synthesized on the right side of the hot zone HZ of the high beam light distribution pattern HP shown in FIGS. 18 and 19A, and the light distribution patterns HP and HBP shown in FIGS. 18 and 19C can be obtained as a whole.

The low bend beam light distribution pattern LBP emitted from the automobile bend lamp mounted on the left side of the front portion of the automobile is synthesized on the left side of the low beam light distribution pattern LP, and the high bend beam light distribution pattern HBP is synthesized on the left side of the hot zone HZ of the high beam light distribution pattern HP.

Since the automobile bend lamp of the present invention in this embodiment is mounted to the reflector 1 of the automobile head lamp, special space for mounting the bend lamp to the vehicle body is unnecessary, and the problem of limitation of the design of the automobile is solved.

In the case of the automobile bend lamp in the automobile lamp of the invention of this embodiment, even if the type of vehicle differs, a desired light distribution pattern can easily be obtained with out variation in mounting precision by mounting the automobile bend lamp to the reflector 1 of the automobile head lamp.

The automobile lamp of the invention in this embodiment can obtain the excellent spot-like high bend beam light distribution pattern HBP at the time of medium speed running by the second reflecting surface 12.

Especially in this embodiment, since the automobile head lamp is a double-lamp type head lamp using a discharge lamp, the lamp has small power consumption, high wattage valve can be used as the light source valve 2 of the automobile bend lamp of the automobile lamp of the invention, and sufficient illumination amount can be obtained correspondingly. The automobile bend lamp in the automobile lamp of the invention can also be applied to another automobile head lamp, e.g., a lamp using a halogen lamp as light source, and a four-lamp type lamp.

The first reflecting surface 11 forming the low bend beam light distribution pattern LBP is provided utilizing the rising wall 15 of the inner side L-IN of the automobile among the reflector 1. Therefore, it is possible to illuminate the side of the outer side R-OUT of the automobile over the wide range, and this is most suitable for forming the low bend beam light distribution pattern LBP for illuminating the side over the wide range.

Further, in this embodiment, the light source valve 2, the movable shade 3 and the driving means 4 are formed as one unit and mounted to the reflector 1. Therefore, the automobile bend lamp of the invention can easily be mounted to the automobile head lamp with high precision.

What is claimed is:

1. An automobile lamp comprising:
   a reflector for forming a light distribution pattern by reflecting light from a light source;
   an effective reflecting surface provided on said reflector for forming at least one of a low beam light distribution pattern and a high beam light distribution pattern;
   a non-effective reflecting surface provided on said reflector for forming at least one of a low bend beam light distribution pattern and a high bend beam light distribution pattern;
   a light source valve disposed on said reflector on the side of said non-effective reflecting surface;
   a movable shade disposed around said light source valve such that said movable shade can move between a first position and a second position;
   driving means for moving said movable shade between said first position and said second position;
   a first reflecting surface provided on said non-effective reflecting surface of said reflector for forming said low bend beam light distribution pattern with light from said light source valve when said movable shade moves to said first position; and
   a second reflecting surface provided on said non-effective reflecting surface of said reflector for forming said high bend beam light distribution pattern with light from said light source valve when said movable shade moves to said second position.

2. The automobile lamp according to claim 1, wherein:
   said light source valve, said movable shade and said driving means are formed as one unit and mounted to said reflector.

3. The automobile lamp according to claim 1, wherein:
   said first reflecting surface forms said low bend beam light distribution pattern directed to the left and right of said low beam light distribution pattern for lighting an outer side area over a wide range; and
   said second reflecting surface forms a spot-like high bend beam light distribution pattern directed to the left and right of a hot zone of said high beam light distribution pattern.

4. The automobile lamp according to claim 1, wherein:
   when the automobile is running at a low speed, and if a blinker switch is ON and/or a steering wheel is being operated, or when the automobile is running at a medium speed and if the steering wheel is being operated, said movable shade is moved to said first position; and when the automobile is running at the medium speed and the blinker switch is ON or when the automobile is running at a high speed and if the blinker switch is ON and/or the steering wheel is being operated, said movable shade is moved to said second position.

5. The automobile lamp according to claim 1, wherein:
said first reflecting surface is a rising wall of said reflector and provided on an inner rising wall of the automobile.

6. An automobile lamp comprising:

a reflector for forming a light distribution pattern to be provided with reflecting light from a first light source;

an effective reflecting surface formed on said reflector in a substantially upper half area thereof and operative to provide selected one of a low beam light distribution pattern and a high beam light distribution pattern to allow said first light source to light a front area of an automobile in said selected one of said low beam light distribution pattern and said high beam light distribution pattern, wherein said high beam light distribution pattern has a substantially central area formed with a hot zone;

a non-effective reflecting surface formed on said reflector in a substantially lower half area thereof to provide a low bend beam light distribution pattern and a high bend beam light distribution pattern;

a central partition wall extending from said reflector at a position between said effective reflecting surface and said non-effective reflecting surface;

a second light source disposed in a region below said central partition wall and in front of said non-effective reflecting surface to allow a light beam of said second light source to be reflected at selected one of said low and high bend beam light distribution patterns;

a first reflecting surface formed on said non-effective reflecting surface to provide said low bend beam light distribution pattern in a substantially horizontal alignment with said low beam light distribution pattern of said first light source;

a second reflecting surface formed on said non-effective reflecting surface to provide said high bend beam light distribution pattern in alignment with said hot zone of said high beam light distribution pattern;

a movable shade disposed around said second light source in the region below said central partition wall and movable in a first position to allow the light beam from said second light source to be reflected at said first reflecting surface and a second position to allow the light beam from said second light source to be reflected at said second reflecting surface; and driving means for moving said movable shade in said first position wherein said light beam from said second light source is reflected at said first reflecting surface to light the front area of said automobile in said low bend beam light distribution pattern in a horizontal alignment with said low beam light distribution pattern, and said second position wherein the light beam from said second light source is reflected at said second reflecting surface to light the front area of said automobile in said hot zone of said high beam light distribution pattern.

7. An automobile lamp comprising:

a reflector for forming a light distribution pattern to be provided with reflecting light from a first light source;

an effective reflecting surface formed on said reflector in a substantially upper half area thereof and operative to provide selected one of a low beam light distribution pattern and a high beam light distribution pattern to allow said first light source to light a front area of an automobile in said selected one of said low beam light distribution pattern and said high beam light distribution pattern, wherein said high beam light distribution pattern has a substantially central area formed with a hot zone;

a non-effective reflecting surface formed on said reflector in a substantially lower half area thereof to provide a low bend beam light distribution pattern and a high bend beam light distribution pattern;

a second light source disposed in a region below said first light source and in front of said non-effective reflecting surface to allow a light beam of said second light source to be reflected at selected one of said low and high bend beam light distribution patterns;

a first reflecting surface formed on said non-effective reflecting surface to provide said low bend beam light distribution pattern in a substantially horizontal alignment with said low beam light distribution pattern of said first light source;

a second reflecting surface formed on said non-effective reflecting surface to provide said high bend beam light distribution pattern in alignment with said hot zone of said high beam light distribution pattern;

a movable shade disposed around said second light source in the region below said first light source and movable in a first position to allow the light beam from said second light source to be reflected at said first reflecting surface and a second position to allow the light beam from said second light source to be reflected at said second reflecting surface; and driving means for moving said movable shade in said first position wherein said light beam from said second light source is reflected at said first reflecting surface to light the front area of said automobile in said low bend beam light distribution pattern in a horizontal alignment with said low beam light distribution pattern, and said second position wherein the light beam from said second light source is reflected at said second reflecting surface to light the front area of said automobile in said hot zone of said high beam light distribution pattern;

wherein said reflector has a bottom wall extending from said non-effective reflecting surface and having a perpendicularly extending mounting hole in which said second light source is detachably mounted.

* * * * *